(12) United States Patent
Chien et al.

(10) Patent No.: US 7,197,369 B1
(45) Date of Patent: Mar. 27, 2007

(54) SEMICONDUCTOR WORK-IN-PROCESS (WIP) DISPATCH MANAGEMENT METHODS AND SYSTEMS

(75) Inventors: Wen-Chi Chien, Houlong Township, Miaoli County (TW); Yu-Wen Lin, Hsinchu (TW); Shih-Ho Chiu, Taipei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 11/324,451

(22) Filed: Jan. 3, 2006

(51) Int. Cl.
*G06F 19/00* (2006.01)

(52) U.S. Cl. .......................................... 700/100; 700/99

(58) Field of Classification Search ................ 700/100, 700/101, 102, 99, 95
See application file for complete search history.

(56) References Cited

U.S. PATENT DOCUMENTS 7,043,318 B1 * 5/2006 Barto et al. ................. 700/100

* cited by examiner

*Primary Examiner*—Zoila Cabrera
(74) *Attorney, Agent, or Firm*—Thomas, Kayden, Horstemeyer & Risley (57) ABSTRACT

A system and method for semiconductor work-in-process (WIP) dispatch management. Information regarding multiple wafer lots to be processed in a process node is acquired. Which wafer lot requires processing prior to the other wafer lots is determined by analyzing a load of multiple successive process nodes for each wafer lot. The analyzed quantity of the load of the successive process nodes for each wafer lots is determined contingent upon a predetermined observation time period.

18 Claims, 8 Drawing Sheets

SEMICONDUCTOR WORK-IN-PROCESS (WIP) DISPATCH MANAGEMENT METHODS AND SYSTEMS

BACKGROUND

The invention relates to semiconductor manufacturing, and more particularly, to methods and systems for semiconductor work-in-process (WIP) dispatch management.

A typical semiconductor fabrication flow for each product is a highly re-entrant process. Each product flow requires the same equipment resource many times before completion of its production cycle. A conventional semiconductor factory typically includes fabrication tools processing semiconductor wafers for a particular purpose, such as photolithography, chemical-mechanical polishing, or chemical vapor deposition. During manufacture, the semiconductor wafer passes through a series of process steps performed by various fabrication tools. For example, in the production of an integrated semiconductor product, the semiconductor wafer passes through up to 600 process steps. Automated dispatch systems initiate personnel or automated transport systems to transport WIPs, such as wafer lots and banks, to desired destinations such as semiconductor fabrication equipment, metrology instruments or stockers.

In a conventional automated manufacturing process, a dispatch system is responsible for initiating the transport system or facility to transport WIPs to the desired destination directly. Two dispatch rules (a tool dispatch rule and a lot dispatch rule) are commonly used to dispatch wafer lots. Using known algorithms, the tool dispatch rule determines the target stocker or the fabrication tool for given WIPs, and the lot dispatch rule determines the target WIPs for given equipment or stockers. These two dispatch rules both attend to many criteria such as priority, yield rate, load balancing, and stability.

The conventional lot dispatch rules determine the target WIPs to be processed based on criterion without considering load-balance factors, such as WIP priorities, resulting in numerous bottlenecks at tool groups and severe production capability reduction.

SUMMARY

Methods for semiconductor WIP (work-in-process) dispatch management comprising using a computer are provided. An embodiment of a method for semiconductor WIP (work-in-process) dispatch management comprises the following steps. Information regarding multiple wafer lots to be processed in a process node is acquired. Which wafer lot requires processing prior to the other wafer lots is determined by analyzing a load of multiple successive process nodes for each wafer lot. The analyzed quantity of the load of the successive process nodes for each wafer lots is determined contingent upon a predetermined observation time period. The disclosed methods are applicable to dispatch of wafer lots to facilitate the fabrication thereof.

The acquired information may regard a first wafer lot and a second wafer lot to be processed. In the step of determining which wafer lot requires processing prior to the other wafer lots may further comprise the following steps. Multiple first successive process nodes for the first wafer lot, and second successive process nodes for the second wafer lot are determined. Multiple first SDs (starvation degrees) are calculated respectively for the first successive process nodes. Multiple second SDs are calculated respectively for the second successive process nodes. First and second SFs (starvation factors) are calculated respectively contingent upon the first SDs and the second SDs. A wafer lot is determined contingent upon the first and second SDs thereof. The first SD or the second SD may be calculated by considering current loading and future loading of the corresponding process node.

Systems for semiconductor WIP (work-in-process) dispatch management are provided. An embodiment of a system comprises a transport system and a dispatch management system. The dispatch management system, coupling to the transportation system, acquires information regarding multiple wafer lots to be processed in a process node, and determines which wafer lot requires processing prior to the other wafer lots by analyzing a load of multiple successive process nodes for each wafer lot, enable transport of the determined wafer lot to the process node via the transport system. The analyzed quantity of the load of the successive process nodes for each wafer lot is determined contingent upon a predetermined observation time period.

The acquired information may regard a first wafer lot and a second wafer lot to be processed. The dispatch management system may determine multiple first successive process nodes for the first wafer lot, and multiple second successive process nodes for the second wafer lot, calculate multiple first SDs (starvation degrees) respectively for the first successive process nodes, calculate multiple second SDs respectively for the second successive process nodes, calculate first and second SFs (starvation factors) respectively contingent upon the first SDs and the second SDs, and determine one of the wafer lots contingent upon the first and second SFs thereof.

The analyzed quantity of the load of the successive process nodes corresponding to any of the wafer lots may be determined by limiting a summation of cycle times of the successive process nodes to a predetermined observation time period. The analyzed quantity corresponding to any of the wafer lots may be calculated by a formula:

$$\sum_{i=1}^{n} CTi \leq s,$$

where n represents the analyzed quantity, CTi represents cycle time of the ith successive process node and s represents a predetermined observation time period. The process nodes may represent process steps or tool groups. CTi may be acquired by querying a MES (manufacturing execution system)

One of the first SDs or one of the second SDs may be calculated by a formula:

$$SDi = Nfi(WIP)/THi/Ni(WIP)/THi,$$

where SDi represents one of the starvation degrees of the corresponding ith process node, Nfi (WIP) represents the quantity of rolling WIPs to be processed in the ith successive process node in a forecast rolling time period, TH represents a throughput of the corresponding ith process node, and Ni (WIP) represents the quantity of WIPs waiting for the corresponding ith process node.

The first SF or the second SF may be calculated by a formula:

$$SFl = \sum_{i=1}^{n} \left( (s - CTi) \Big/ \sum_{i=1}^{n} (s - CTi(l)) * SDi \right),$$

where l represents the first wafer lot or second wafer lot, SFl represents a starvation factor of the wafer lot l, n represents an analyzed quantity of successive process nodes corresponding to the wafer lot l, s represents the predetermined observation time period, CTi (l) represents cycle time of the ith process node for wafer lot l, and SDi represents the starvation degree of the ith process node.

BRIEF DESCRIPTION OF THE DRAWINGS

The invention will become more fully understood by referring to the following detailed description of embodiments with reference to the accompanying drawings, wherein.

DESCRIPTION

Figure 1:
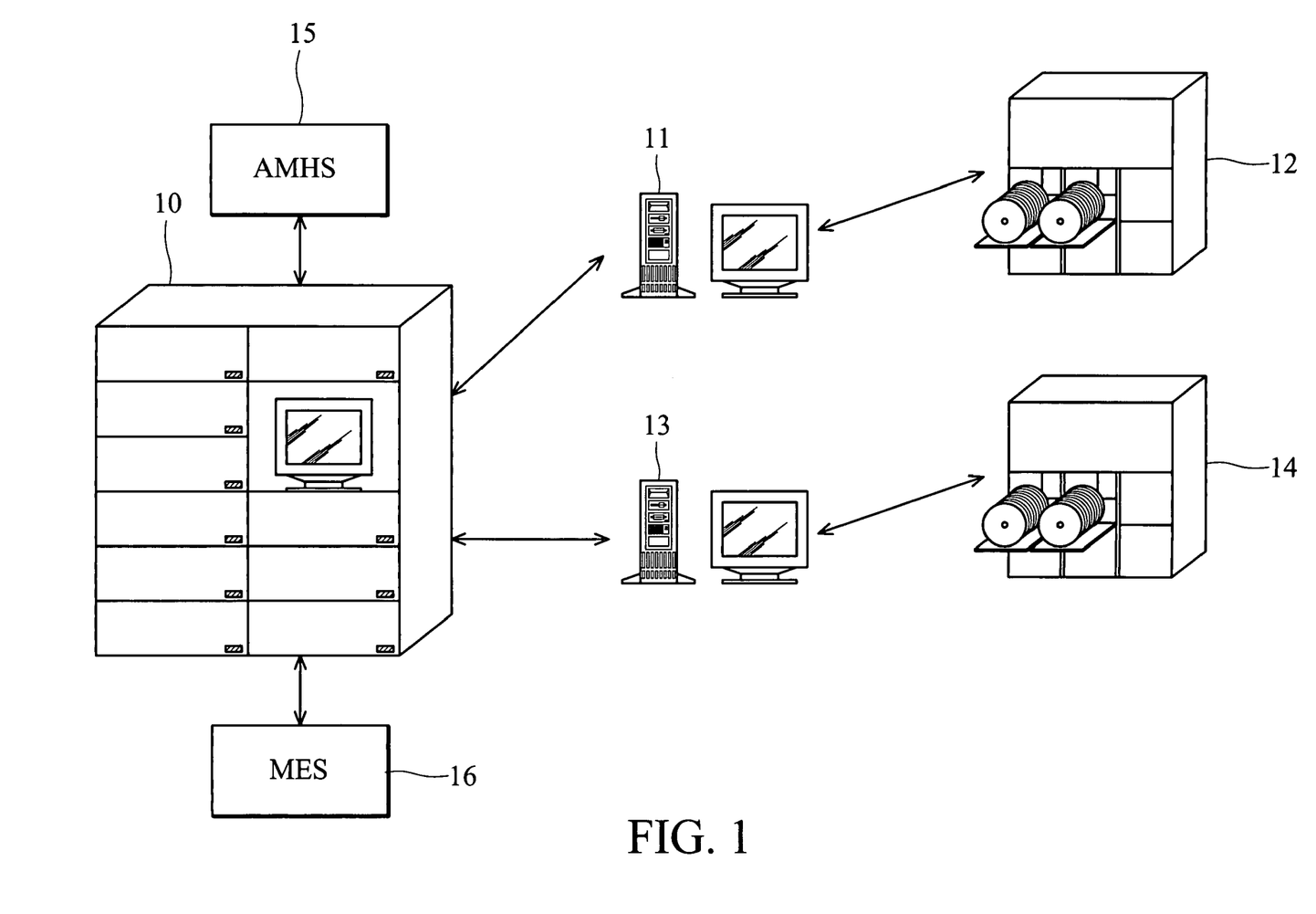
FIG. 1 is a diagram of an embodiment of a semiconductor WIP (work-in-process) dispatch management system.

FIG. 1 is a diagram of an embodiment of a semiconductor WIP (work-in-process) dispatch management system, comprising a dispatch control system 10, host computers 11 and 13, and fabrication tools 12 and 14, an AMHS (automated material handling system) 15, and a MES (Manufacturing Execution System) server 16. The dispatch control system 10 connects to host computers 11 and 13. The host computers respectively connect to fabrications tool 12 and 14. Those skilled in the art will appreciate that the MES 16 and the dispatch control system 10 can be integrated into a single computer.

Fabrication tools 12 and 14 typically perform a single wafer fabrication task on the wafers in a given lot. For example, a particular fabrication tool may perform layering, patterning, doping, implanting or heat treatment operations. Fabrication tools 12 and 14 preferably provide software services compliant with 300 mm semiconductor equipment and material international (SEMI) standards specifying transport protocol, message format and functionality.

The dispatch control system 10 follows a series of standard procedural steps to issue commands to the AMHS 15, and the AMHS 15 transfers wafer carriers accordingly. WIPs are typically stored in containers, such as cassettes, each of which holds up to 25 wafers. The cassettes are then loaded in carriers, such as standard mechanical interfaces (SMIFs) or front opening unified pods (FOUPs) for transport throughout the factory. A carrier may contain multiple WIPs to undergo a fabrication task.

The MES 16 may be an integrated computer system representing the methods and tools used to accomplish production. For example, the primary functions of the MES 16 may include collecting production data in real time, organizing and storing the production data in a centralized database, work order management, fabrication tool management and process management. Examples of the MES 16 include Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications.

Figure 2:
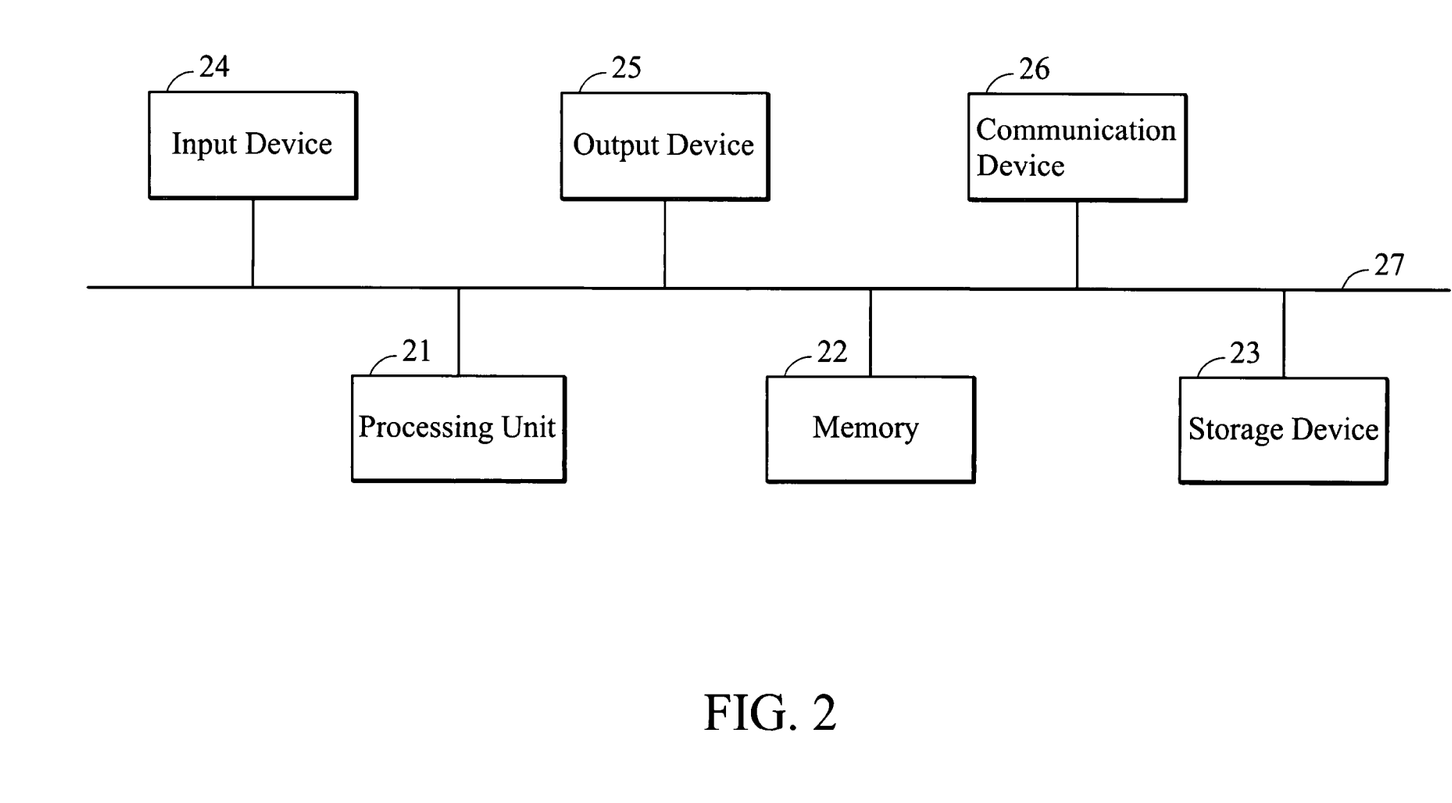
FIG. 2 is a diagram of hardware architecture of an embodiment of a dispatch control system.

FIG. 2 is a diagram of hardware architecture of an embodiment of a dispatch control system, comprising a processing unit 21, memory 22, a storage device 23, an input device 24, an output device 25 and a communication device 26. The processing unit 21 is connected by buses 27 to the memory 22, storage device 23, input device 24, output device 25 and communication device 26 based on Von Neumann architecture. There may be one or more processing units 21, such that the processor of the computer comprises a single central processing unit (CPU), a micro processing unit (MPU) or multiple processing units, commonly referred to as a parallel processing environment. The memory 32 is preferably a random access memory (RAM), but may also include read-only memory (ROM) or flash ROM. The memory 22 preferably stores program modules executed by the processing unit 21 to perform WIP dispatch management functions. Generally, program modules include routines, programs, objects, components, or others, that perform particular tasks or implement particular abstract data types. Moreover, those skilled in the art will understand that at least some embodiments may be practiced with other computer system configurations, including hand-held devices, multiprocessor-based, microprocessor-based or programmable consumer electronics, network PCs, mini-computers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web object, Web Services or other similar architectures. The storage device 23 may be a hard drive, magnetic drive, optical drive, a portable drive, or nonvolatile memory drive. The drives and their associated computer-readable media (if required) provide nonvolatile storage of computer-readable instructions, data structures or program modules. The communication device 26 may be an Ethernet drive or a wireless network drive compatible with 802.x or GPRS.

Figure 3:
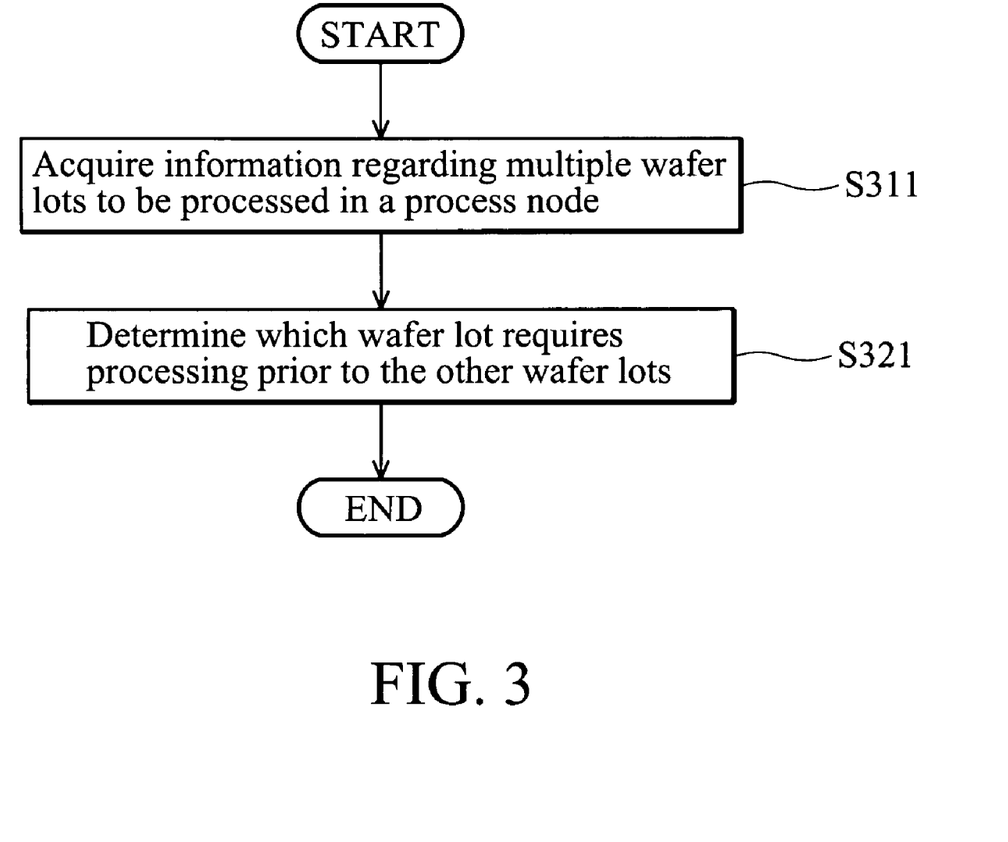
FIGS. 3 and 4 are flowcharts of embodiments of methods of semiconductor WIP dispatch management.

FIG. 3 is a flowchart of an embodiment of a method of semiconductor WIP dispatch management showing steps performed by the dispatch control system 10. In step S311, information regarding multiple wafer lots to be processed in a process node is acquired. In step S321, which wafer lot requires processing prior to the other wafer lots is determined by analyzing multiple loads of successive process nodes respectively corresponding to the wafer lots. The analyzed quantity of loads of the successive process node corresponding to one of the wafer lots is determined contingent upon a predetermined observation time period. The disclosed methods are applicable to dispatch of wafer lots to facilitate the fabrication thereof.

Figure 4:
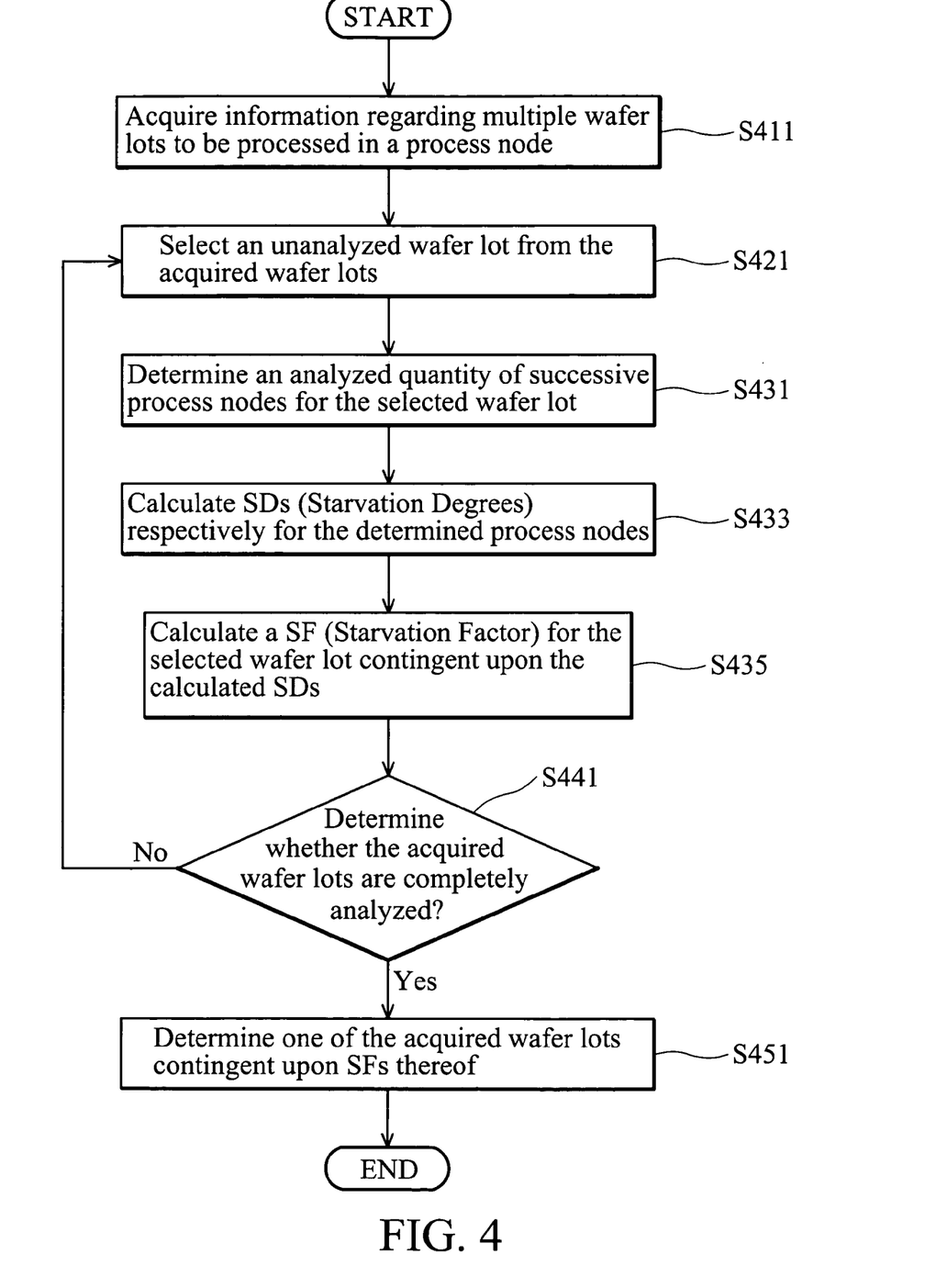

FIG. 4 is a flowchart of an embodiment of a method of semiconductor WIP dispatch management showing steps performed by the dispatch control system 10. In step S411, information regarding which wafer lots to be processed in a candidate process node is acquired. The candidate process node may represent a process step or a tool group. The information acquisition may be achieved by query the MES 16. In step S421, an unanalyzed wafer lot is selected from the acquired wafer lots. In step S431, an analyzed quantity of successive process nodes is determined for the selected wafer lot. The analyzed quantity of successive process nodes for the selected wafer lot is determined by limiting the summation of cycle time of successive process nodes to a predetermined observation time period, such as 8, 24 hours and the like. The acquisition of successive process nodes for the selected wafer lot, and cycle times thereof may be achieved by query the MES 16. The analyzed quantity of successive process nodes for the selected wafer lot can be calculated by formula (1).

Figure 5:
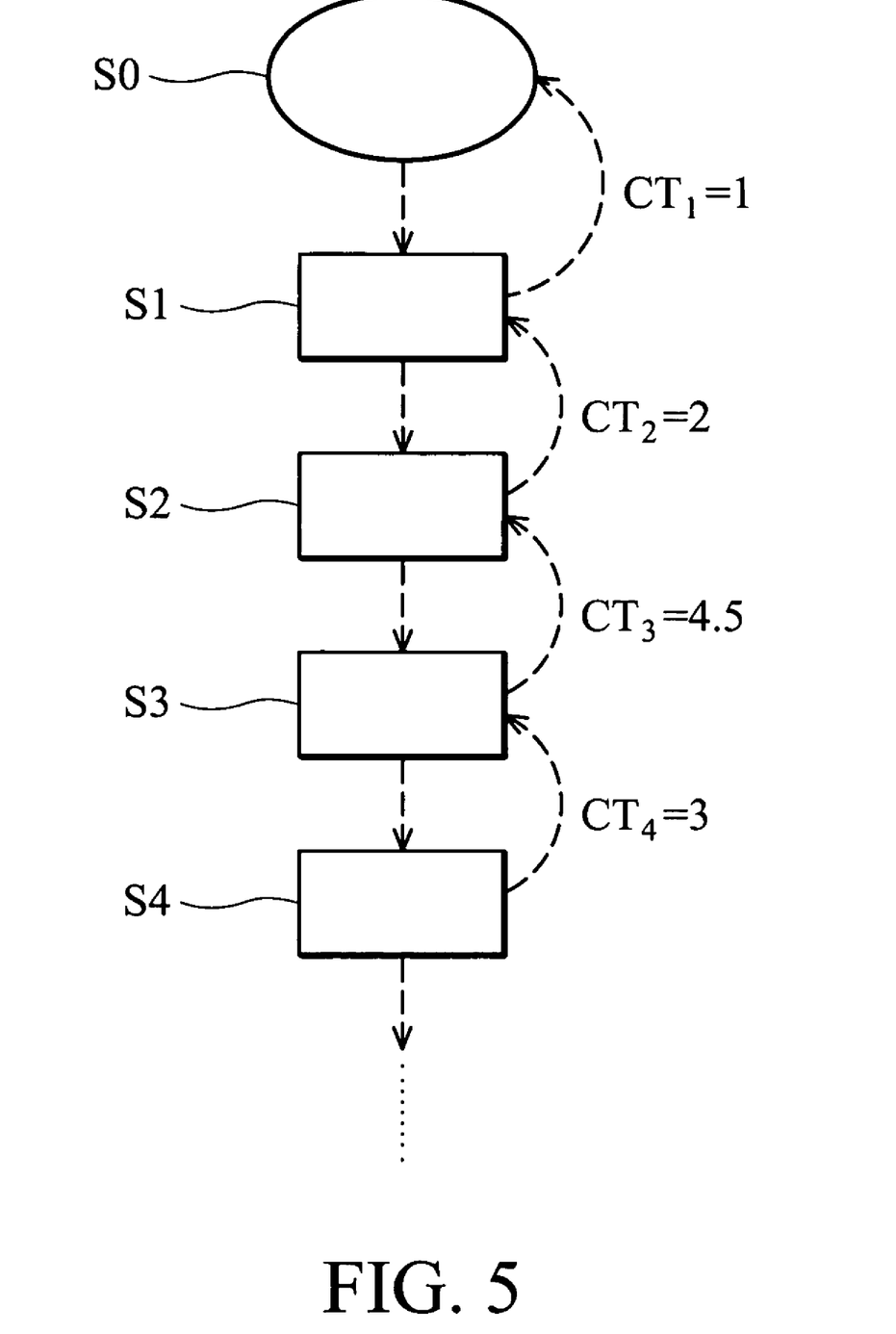
FIG. 5 is a diagram of an exemplary process flow.

Formula (1):

$$\sum_{i=1}^{n} CTi \leq s,$$

where n represents an analyzed quantity of successive process nodes, CTi represents cycle time of the ith successive process node and s represents a predetermined observation time period. FIG. 5 is a diagram of an exemplary process flow, containing five process nodes, S0 to S4. S0 represents a candidate process node, and S1 to S4 represent successive process nodes for a particular wafer lot. The cycle times of S1 to S4 are respectively 1, 2, 4.5 and 3 hours. When a predetermined observation time period is set to 8 hours, the analyzed quantity of successive process nodes for the selected wafer lot is determined to be 3. Conventional dispatch methods often only examine the load of one successive process node.

In step S433, SDs (starvation degrees) respectively for the determined process nodes are calculated. The SD for a process node is calculated by considering current and future loadings of the process node. The SD for a successive process node can be calculated by formula (2).

Formula (2):

$$SDi = Nfi(WIP)/THi/Ni(WIP)/THi,$$

where SDi represents a starvation degree of the ith successive process node, Nfi (WIP) represents the quantity of rolling WIPs to be processed in the ith successive process node in a forecast rolling time period, preferably 24 hours, TH represents a throughput of the ith successive process node and Ni (WIP) represents the quantity of WIPs waiting for the ith successive process node. The acquisition of Ni (WIP), THi and Nfi (WIP) may be achieved by querying the MES 16. Note that Nfi (WIP)/THi is an exemplary formula to represent future loading for the ith successive process node and Ni (WIP)/THi is an exemplary formula to represent current loading for the ith successive process node.

In step S435, a SF (starvation factor) for the selected wafer lot is calculated contingent upon the calculated SDs. The SF for the selected wafer lot can be calculated by formula (3).

Formula (3):

$$SFl = \sum_{i=1}^{n} \left( (s - CTi) \bigg/ \sum_{i=1}^{n} (s - CTi(l)) * SDi \right),$$

where SFl represents a starvation factor of the selected wafer lot l, n represents an analyzed quantity of successive process nodes corresponding to the selected wafer lot l, s represents a predetermined observation time period, CTi (l) represents cycle time of the ith successive process node for wafer lot l, and SDi represents a starvation degree of the ith successive process node. The acquisition of Ni (WIP), THi and Nfi (WIP) may be achieved by querying the MES 16. Note that a wafer lot having a higher SF requires to be processed earlier than that having a lower SF.

In step S441, it is determined whether the acquired wafer lots are completely analyzed, and, if so, the process proceeds to step S451, and otherwise, to step S421. In step S451, one of the acquired wafer lots is determined contingent upon SFs thereof. Preferably, the wafer lot having the highest SF is determined. It may further direct the transportation of the determined wafer lot to the candidate process node using the AMHS 15. The disclosed methods are applicable to dispatch of wafer lots to facilitate the fabrication thereof.

Details of the method for semiconductor WIP dispatch management will become more fully understood by referring to the following example. The observation time period is set to 24 hours. In step S411, information regarding two wafer lots l1 and l2 to be processed in a tool group S0 is acquired.

Figure 6A:
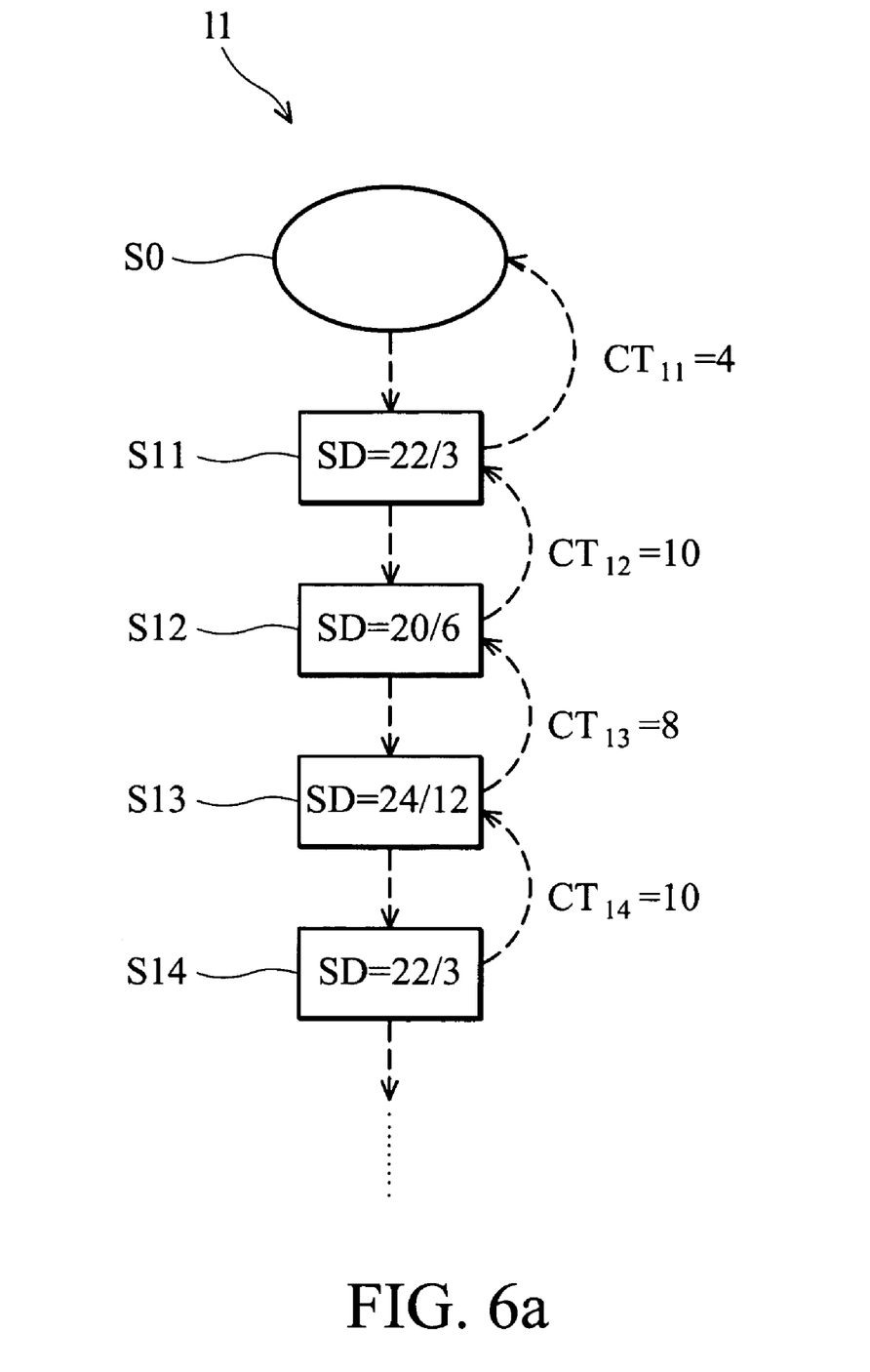
FIGS. 6a and 6b are diagrams of exemplary process flows for wafer lots.

In step S421, wafer lot l1 is selected as an analyzed wafer lot. FIG. 6a is a diagram of an exemplary process flow for wafer lot l1. In step S431, information regarding successive tool groups S11 to S14 for the wafer lot l1 is acquired, and an analyzed quantity of successive tool groups for the wafer lot l1 is determined to be three by formula (1). In step S433, SDs respectively for the observation tool groups, S11 to S13, are calculated by formula (2). The calculated SDs are 22/3, 20/6 and 24/12. In step S435, a SF for wafer lot l1 is calculated by formula (3). The SF for wafer lot l1 is (20/32×22/3)+(10/32×20/6)+(2/32×24/12)=5.75.

Figure 6B:
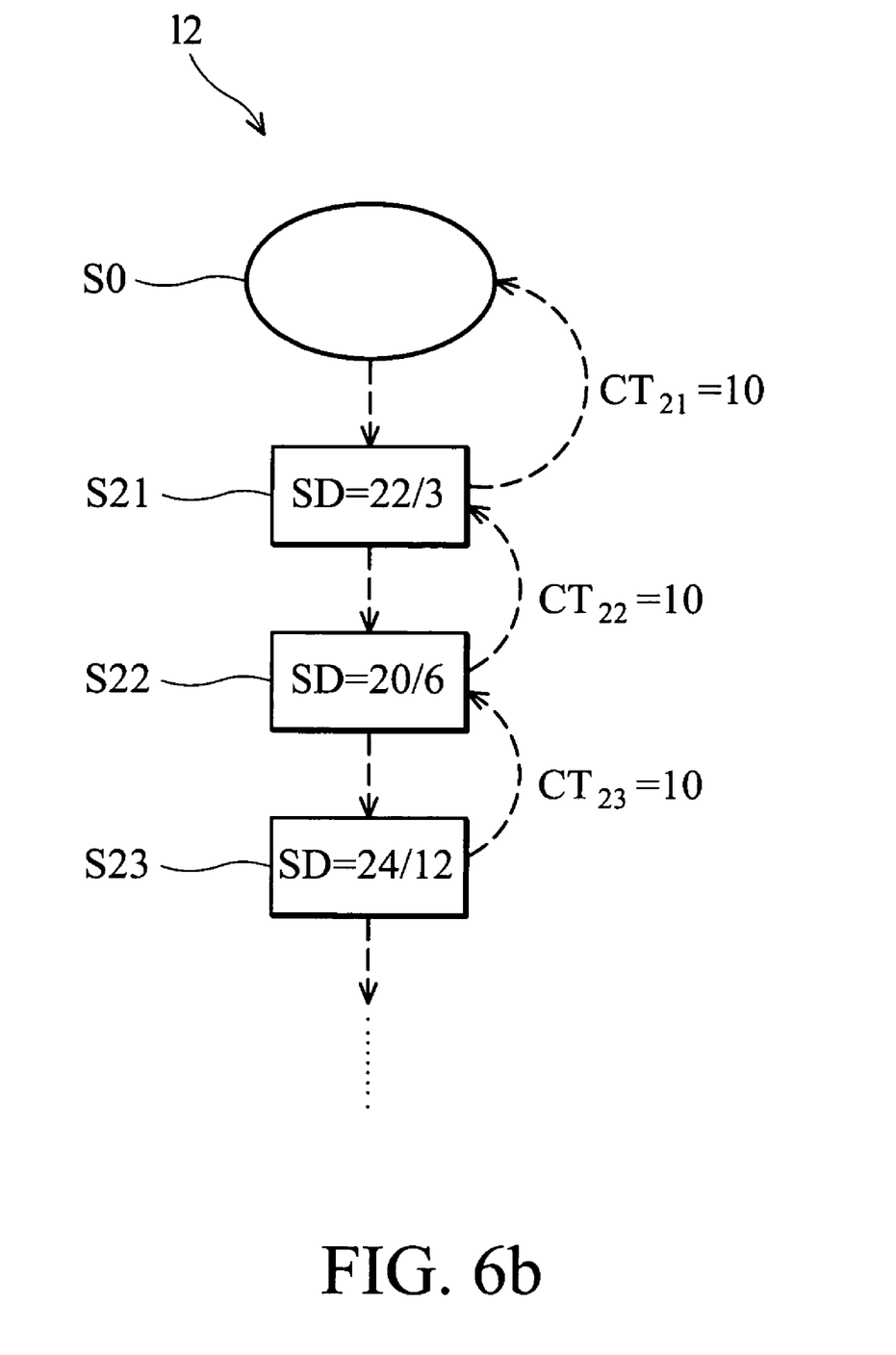

In step S421, wafer lot l2 is selected as an analyzed wafer lot. FIG. 6b is a diagram of an exemplary process flow for wafer lot l2. In step S431, information regarding which successive process nodes S21 to S23 for the wafer lot l2 is acquired, and an analyzed quantity of successive tool groups for the wafer lot l2 is determined to be two by formula (1). In step S433, SDs respectively for the observation tool groups, S21 to S22, are calculated by formula (2). The calculated SDs are 22/3 and 20/6. In step S435, a SF for wafer lot l2 is calculated by formula (3). The SF for wafer lot l2 is (14/18×22/3)+(4/18×20/6)=12.194.

In step S451, wafer lot l2 is determined. The determination will direct the transportation of wafer lot l2 to the tool group S0.

Figure 7:
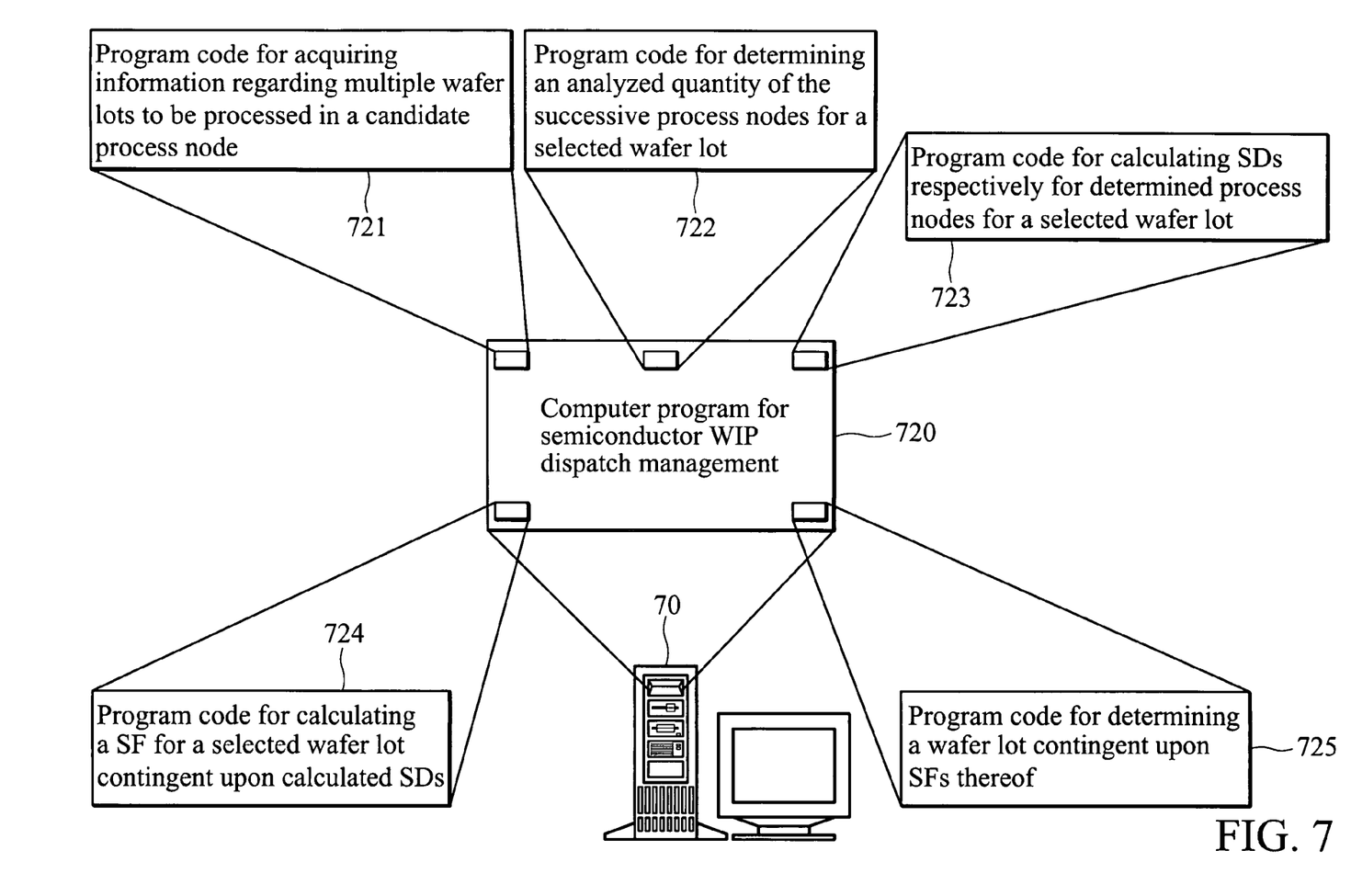
FIG. 7 is a diagram of a storage medium storing a computer program providing an embodiment of a method of semiconductor WIP dispatch management.

Also disclosed is a storage medium as shown in FIG. 7 storing a computer program 720 providing the disclosed method of semiconductor WIP dispatch management performed by the dispatch system 10. The computer program product includes a storage medium 70 having computer readable program code embodied therein. The computer readable program code comprises at least computer readable program code 721 acquiring information regarding multiple wafer lots to be processed in a candidate process node, computer readable program code 722 determining an analyzed quantity of the successive process nodes for a selected wafer lot, computer readable program code 723 calculating SDs respectively for determined process nodes for a selected wafer lot, computer readable program code 724 calculating a SF for a selected wafer lot contingent upon calculated SDs and computer readable program code 725 determining a wafer lot contingent upon SFs thereof.

The methods and systems of the embodiments, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in terms of preferred embodiment, it is not intended to limit thereto. Those skilled in the technology can still make various alterations and modifications without departing from the scope and spirit of this invention. Therefore, the scope of the present invention shall be defined and protected by the following claims and their equivalents.

What is claimed is:

1. A method of semiconductor work-in-process (WIP) dispatch management comprising using a computer to perform the steps of:
   acquiring information regarding a plurality of wafer lots to be processed in a process node by the computer;
   determining which wafer lot requires processing prior to the other wafer lots by analyzing a load of a plurality of successive process nodes for each wafer lot by the computer; and
   directing a transport system to transport the determined wafer lot to the process node by the computer,
   wherein the analyzed quantity of the successive process nodes corresponding to any of the wafer lots is determined by limiting a summation of cycle times of the successive process nodes to a predetermined observation time period.

2. The method of claim 1 wherein the analyzed quantity corresponding to any of the wafer lots is calculated by a formula, $$\sum_{i=1}^{n} CTi \leq s,$$

n representing the analyzed quantity, CTi representing cycle time of the ith successive process node, and s representing a predetermined observation time period.

3. A method of semiconductor work-in-process (WIP) dispatch management comprising using a computer to perform the steps of:
   acquiring information regarding a plurality of wafer lots to be processed in a process node by the computer;
   determining which wafer lot requires processing prior to the other wafer lots by analyzing a load of a plurality of successive process nodes for each wafer lot by the computer; and
   directing a transport system to transport the determined wafer lot to the process node by the computer,
   wherein the acquired information regarding a first wafer lot and a second wafer lot to be processed, and the step of determining one of the wafer lots to be processed earlier than the other wafer lot further comprises:
   determining a plurality of first successive process nodes for the first wafer lot, and a plurality of second successive process nodes for the second wafer lot;
   calculating a plurality of first SDs (starvation degrees) respectively for the first successive process nodes;
   calculating a plurality of second SDs respectively for the second successive process nodes;
   calculating first and second SFs (starvation factors) respectively contingent upon the first SDs and the second SDs; and
   determining one of the wafer lots contingent upon the first and second SFs thereof.

4. The method of claim 3 wherein the analyzed quantity corresponding to any of the wafer lots is determined by limiting a summation of cycle time of the corresponding first and second successive process nodes to a predetermined observation time period.

5. The method of claim 3 wherein one of the first SDs or one of the second SDs is calculated by considering current loading and future loading for a designated process node.

6. The method of claim 3 wherein one of the first SDs or one of the second SDs is calculated by a formula, $$SDi = Nfi(WIP)/THi/Ni(WIP)/THi,$$

SDi representing one of the starvation degrees of the corresponding ith process node, Nfi(WIP) represents the quantity of rolling WIPs to be processed in the ith successive process node in a forecast rolling time period, TH representing a throughput of the corresponding ith process node, and Ni(WIP) representing the quantity of WIPs waiting for the corresponding ith process node.

7. The method of claim 6 wherein the first SF or the second SF is calculated by a formula, $$SFl = \sum_{i=1}^{n} \left( (s - CTi) \bigg/ \sum_{i=1}^{n} (s - CTi(l)) * SDi \right),$$

where l representing the first wafer lot or second wafer lot, SFl representing a starvation factor of the wafer lot l, n representing an analyzed quantity of successive process nodes corresponding to the wafer lot l, s representing the predetermined observation time period, CTi(l) representing cycle time of the ith process node for wafer lot l, and SDi representing the starvation degree of the ith process node.

8. The method of claim 3 wherein the process nodes represents process steps or tool groups.

9. An electronic device is fabricated in a fabrication factory utilizing the method of semiconductor work-in-process (WIP) dispatch management method comprising using a computer to perform the steps of:
   acquiring information regarding a plurality of wafer lots to be processed in a process node by the computer;
   determining which wafer lot requires processing prior to the other wafer lots by analyzing a load of a plurality of successive process nodes for each wafer lots by the computer; and
   directing a transport system to transport the determined wafer lot to the process node by the computer,
   wherein the analyzed quantity of the successive process nodes corresponding to any of the wafer lots is determined by limiting a summation of cycle times of the successive process nodes to a predetermined observation time period.

10. A system of semiconductor WIP (work-in-process) dispatch management comprising:
a transport system; and
a dispatch management system coupling to the transportation system, acquiring information regarding a plurality of wafer lots to be processed in a process node, and determining which wafer lot requires processing prior to the other wafer lots by analyzing a load of a plurality of successive process nodes for each wafer lot, enabling to transport the determined wafer lot to the process node via the transport system,
wherein the analyzed quantity of the successive process nodes corresponding to any of the wafer lots is determined by limiting a summation of cycle times of the successive process nodes to a predetermined observation time period.

11. The system of claim 10 wherein the analyzed quantity corresponding to any of the wafer lots is calculated by a formula, $$\sum_{i=1}^{n} CTi \leq s,$$

n representing the analyzed quantity, CTi representing cycle time of the ith successive process node and s representing a predetermined observation time period.

12. The system of claim 11 wherein CTi is acquired by querying a MES (manufacturing execution system).

13. The system of claim 10 wherein the acquired information regarding a first wafer lot and a second wafer lot to be processed and the dispatch management system determines a plurality of first successive process nodes for the first wafer lot, and a plurality of second successive process nodes for the second wafer lot, calculates a plurality of first SDs (starvation degrees) respectively for the first successive process nodes, calculates a plurality of second SDs respectively for the second successive process nodes, calculates first and second SFs (starvation factors) respectively contingent upon the first SDs and the second SDs, and determines one of the wafer lots contingent upon the first and second SFs thereof.

14. The system of claim 13 wherein the analyzed quantity corresponding to any of the wafer lots is determined by limiting a summation of cycle time of the correspondingly first and second successive process nodes to a predetermined observation time period.

15. The system of claim 14 wherein one of the first SDs or one of the second SDs is calculated by considering current loading and future loading for a designated process node.

16. The system of claim 13 wherein one of the first SDs or one of the second SDs is calculated by a formula, $$SDi = Nfi(WIP)/THi/Ni(WIP)/THi,$$

SDi representing one of the starvation degrees of the corresponding ith process node, Nfi(WIP) represents the quantity of rolling WIPs to be processed in the ith successive process node in a forecast rolling time period, TH representing a throughput of the corresponding ith process node, and Ni(WIP) representing the quantity of WIPs waiting for the corresponding ith process node.

17. The system of claim 16 wherein the first SF or the second SF is calculated by a formula, $$SFl = \sum_{i=1}^{n} \left( (s - CTi) \bigg/ \sum_{i=1}^{n} (s - CTi(l)) * SDi \right),$$

where l representing the first wafer lot or second wafer lot, SFl representing a starvation factor of the wafer lot l, n representing an analyzed quantity of successive process nodes corresponding to the wafer lot l, s representing the predetermined observation time period, CTi(l) representing cycle time of the ith process node for wafer lot l, and SDi representing the starvation degree of the ith process node.

18. The system of claim 10 wherein the process nodes represents process steps or tool groups.

* * * * *